US009396550B2

(12) United States Patent
Reymond et al.

(10) Patent No.: US 9,396,550 B2
(45) Date of Patent: Jul. 19, 2016

(54) METHOD FOR UPDATING A VALUE OF ORIENTATION WITH RESPECT TO NORTH OR FOR IMPROVING THE INITIALIZATION OF SUCH A VALUE IN AN APPARATUS COMPRISING AN IMAGE SENSOR

(75) Inventors: Georges-Olivier Reymond, Paris (FR); Hervé Lamarre, Paris (FR); Lionel Rosellini, Paris (FR)

(73) Assignee: Sagem Defense Securite, Paris (FR)

( * ) Notice: Subject to any disclaimer, the term of this patent is extended or adjusted under 35 U.S.C. 154(b) by 156 days.

(21) Appl. No.: 14/004,022

(22) PCT Filed: Mar. 16, 2012

(86) PCT No.: PCT/EP2012/054727
§ 371 (c)(1),
(2), (4) Date: Sep. 24, 2013

(87) PCT Pub. No.: WO2012/126857
PCT Pub. Date: Sep. 27, 2012

(65) Prior Publication Data
US 2014/0010413 A1 Jan. 9, 2014

(30) Foreign Application Priority Data
Mar. 21, 2011 (FR) ..................... 11 00855

(51) Int. Cl.
*G06K 9/00* (2006.01)
*G06T 7/20* (2006.01)
*G01C 17/38* (2006.01)
*G01C 19/00* (2013.01)
*G01C 25/00* (2006.01)

(52) U.S. Cl.
CPC . *G06T 7/20* (2013.01); *G01C 17/38* (2013.01); *G01C 19/00* (2013.01); *G01C 25/005* (2013.01)

(58) Field of Classification Search
None
See application file for complete search history.

(56) References Cited

U.S. PATENT DOCUMENTS

| 7,284,866 B2* | 10/2007 | Buchmann | G02B 26/0816 353/121 |
| 7,841,094 B2* | 11/2010 | Schumacher | 33/282 |
| 7,932,925 B2* | 4/2011 | Inbar | G02B 27/646 348/169 |
| 8,068,696 B2* | 11/2011 | Crombez et al. | 382/294 |
| 8,447,071 B2* | 5/2013 | Ohta | 382/103 |
| 8,717,441 B2* | 5/2014 | Ohta | G01S 3/7864 348/143 |
| 8,798,319 B2* | 8/2014 | Metzler | 382/103 |
| 8,826,550 B2* | 9/2014 | Gnepf | 33/228 |
| 9,069,064 B2* | 6/2015 | Ohta | |
| 2008/0136923 A1* | 6/2008 | Inbar et al. | 348/208.2 |
| 2012/0032877 A1* | 2/2012 | Watkins et al. | 345/156 |

FOREIGN PATENT DOCUMENTS

JP 2009-074859 A 4/2009

* cited by examiner

*Primary Examiner* — Soo Park
(74) *Attorney, Agent, or Firm* — Muncy, Geissler, Olds & Lowe, P.C.

(57) ABSTRACT

The invention relates to a method for updating and/or for initializing, in a system comprising an image sensor oriented towards the horizon such as a pair of binoculars coupled to a geographical north seeker incorporating a gyrometer, a value representative of the orientation of the image sensor with respect to north, in which the shift of two images arising from the digital image sensor is determined at a first instant and at a second instant that are distinct so as to construct an item of information representative of an angular movement, and in which this angular movement information is utilized to: update the value of orientation of the image sensor;—and/or to discriminate the movements of the image sensor with respect to the ground from the movements of the image sensor that are due to the rotation of the earth, in a process for initializing the value of orientation of the image sensor using a north seeker of gyroscopic or gyrometric type rigidly tied to the image sensor.

7 Claims, No Drawings

METHOD FOR UPDATING A VALUE OF ORIENTATION WITH RESPECT TO NORTH OR FOR IMPROVING THE INITIALIZATION OF SUCH A VALUE IN AN APPARATUS COMPRISING AN IMAGE SENSOR

The invention relates to the initialization and the updating of information regarding orientation of an apparatus with respect, to the geographic North.

BACKGROUND OF THE INVENTION

It is known practice to identify the orientation of the geographic North with a North seeker comprising a gyrometer connected to calculating means, or else with a stellar observation system.

The identification of the North with a gyrometer seeker relies on a process of measurement of the component of the terrestrial rotation vector in a horizontal plane, i.e. tangent, to the Earth at the site where the device is installed, this component being directed toward the geographic North.

Such means may be used with infantry binoculars: the North seeker and the binoculars rigidly attached together and connected together are held up by a tripod, which makes it possible to determine the bearing of a target. When this target is seen in the binoculars, the knowledge of the orientation of the geographic North, i.e. the knowledge of the orientation of the binoculars with respect to the geographic North, corresponds to the bearing where the target is found.

In this context, the angular accuracy required is of the order of milliradians. Possible spurious movements, i.e. the movements of the gyrometer with respect to the ground, such as for example the sinking of the tripod into the ground, are likely to falsify the measurement carried out by the gyrometer in the process of initialization of the orientation value of the binoculars with respect to the geographic North.

To avoid these spurious movements being interpreted by the gyrometer as being due to the rotation of the Earth, a precision accelerometer is also provided. This accelerometer makes it possible to identify the spurious movements so as to distinguish them, so that they do not falsify the measurement of the Earth's rotation performed by the gyrometer.

Moreover, a limitation of known North seekers lies in the fact that the phase of initialization of the value of orientation of the North is carried out. on the spot, so that if the binoculars are moved after this initialization, the information about the orientation of the North that they use is erroneous.

SUBJECT OF THE INVENTION

The aim of the invention is to provide a solution making it possible to carry out at a lower cost the initialization and/or the updating of the geographic North with a satisfactory accuracy.

SUMMARY OF THE INVENTION

For this purpose, the subject of the invention is a method for updating and/or for initializing, in a system comprising an image sensor oriented toward the horizon, a value representative of the orientation of the image sensor with respect to the North, in which is determined the offset of two images output, by the digital image sensor at distinct first and second instants so as to constitute an item of information representative of an angular movement, and in which this angular movement information is used for:

updating the value of the orientation of the image sensor with respect to the geographic North;
and/or discriminating between the movements of the image sensor with respect to the ground and the movements of the image sensor due to the rotation of the Earth, in a process of initialization of the orientation value of the image sensor with respect to the North using a North seeker of gyroscopic or gyrometric type rigidly attached to the image sensor.

In these conditions, the image sensor, which is necessarily part of the system used, is employed to provide information representative of the movements of the system with respect to the ground, in such a way that the accelerometric sensor habitually used to supply this information is no longer necessary.

The invention also relates to a method as defined above, in which the determination of the offset of the two images is carried out with image processing of the type used for image stabilization, in which the two images are compared in a global manner to determine the offset of these two images.

The invention also relates to a method as defined above, in which the determination of the offset of the two images is carried out by identifying a same object in these two images, by determining the position of this object in each of these images, and by determining the difference between the positions thus determined.

The invention also relates to a method as defined above, in which the images of which the offset is determined are two images representative of the scene seen by the image sensor at two distinct instants, so that the offset is representative of the movements of the digital image sensor with respect to the ground.

The invention also relates to a method as defined above, in which the two images of which the offset is determined are on the one hand an intermediate image corresponding to an image of the scene, seen by the image sensor at a first instant and offset by a value corresponding to the movement measured by the North seeker during the interval separating the first instant from the second instant, and an image corresponding to the scene seen by the image sensor at the second instant, so that this offset is representative of the movement of the Earth seen from an inertial reference frame during the time interval separating the first instant from the second instant.

The invention also relates to a method as defined above, in which the initialization process uses a North seeker of the Inertial Measurement Unit type.

The invention also relates to a method as defined above, in which the Inertial Measurement Unit is based on MEMS-type components.

The invention also relates to a method as defined above, in which the updating of the value of the orientation of the image sensor with respect to the North is carried out on the basis of information output by the Inertial Measurement Unit when the offset of the images cannot be determined.

DETAILED DESCRIPTION OF THE INVENTION

The basic idea of the invention is to connect a digital image sensor to a gyrometer, soldering them stiffly together, in order to measure the movements of the system with respect to the ground by comparing the images output by the digital image sensor.

In these conditions, the use of the images output by the digital image, sensor replaces at lower cost the use of a precision accelerometer dedicated to the measurement of the movements of the system with respect to the ground.

In concrete terms the North seeker, which contains a gyrometer incorporating connected calculating means, is mounted on a tripod supporting a digital image sensor such as a pair of digital binoculars. The gyrometer is connected to these binoculars, for example by a data transmission cable, to exchange data with these binoculars. The binoculars are rigidly attached to the North seeker, in such a way that when they turn about a vertical axis, the North seeker turns with them, and they are oriented substantially toward the horizon.

When the process of seeking the North is triggered by the user, the gyrometer and the calculating means measure the movements of the gyrometer to determine the component of the Earth's rotation vector in a plane tangential to the Earth at the site where the assembly is installed.

This process allows the apparatus to determine the orientation of the geographic North, i.e. to initialize a value representative of the orientation of the North seeker with the binoculars to which it is rigidly attached, with respect to the geographic North.

In a general manner, the movements experienced by the gyrometer comprise the movement of the Earth at the site where the gyrometer is installed, and the possible movements of the gyrometer with respect to the ground, due for example to a sinking of the tripod into the ground, and which constitute spurious movements as regards the North seeking.

To improve the accuracy of the determination of the North in the initialization process, the spurious movements are distinguished, that is to say they are evaluated and deducted, from the movements measured by the gyrometer. The measurement, of the rotation of the Earth does not therefore take into account these spurious movements, but only the movement of the Earth at the site of the system.

According to the invention, the spurious movements are determined, during the process of determination of the North, by analysis of a series of images output by the digital binoculars to measure the spatial offset between two images acquired at distinct first and second instants in order to deduce the spurious angular movement of the apparatus comprising the binoculars and the North seeker during the time, interval separating these two images.

The system contains image analyzing means, for example enabling the identification of a noticeable object in a given image, this object exhibiting for example a relatively high contrast delimiting an outline of a shape that can be identified in an automatic and reliable way.

The detection of spurious movements thus consists in identifying a noticeable element in an image representative of the scene seen by the image sensor, and in determining its position in this first image, then in identifying this same element in a second image, later and representative also of the scene seen by the sensor, so as to determine its position in this other image. As will be understood, the difference in position corresponds to the spatial offset of the two images.

This offset corresponds for example to a certain number of pixels, since given the resolution of the digital image sensor equipping the binoculars, a displacement of an object in the image, by a distance of one pixel corresponds to a predetermined angular value, of rotation of the binoculars.

In these conditions, the knowledge of the offset, of the two images makes it possible to determine in a very simple way the corresponding rotational movement of the binoculars, so that it can be distinguished in the process of measurement of the Earth's rotation, enabling the initialization of the value representative of the orientation of the apparatus with respect to the geographic North.

Additionally, the knowledge of the time period separating the instants at which the two analyzed images have been acquired makes it possible to determine in a simple manner the rotational velocity of the binoculars with respect to the ground, so that it can be distinguished in the process of measurement of the Earth's rotation.

The offset of the images is advantageously reckoned along a vertical axis of the images, which thus corresponds to a rotation of the binoculars about a horizontal axis oriented transversally to the direction of observation, which is of a kind to strongly disturb the measurement of the axis of rotation of the Earth, i.e. the initialization of the geographic North.

The image analysis processing used to determine the spatial offset of the images may also be a. processing of global type, i.e. in which the offset of two images is identified by comparing them globally instead of seeking in these images a particular element that they both contain.

Such a processing is relatively similar to known processes in the field of digital image stabilization, where knowledge is also sought of the spatial offset of two acquired images in order to calibrate the displayed image.

By way of example, the accuracy in the evaluation of the spatial offset of two images can reach $1/100^{th}$ of a pixel, and the resolution of the digital image sensor equipping the binoculars can be such that the angle of rotation corresponding to a distance of one pixel in the image has a value of 140 microradians. In these conditions, the accuracy of detection of the spurious movements is of the order of 1.4 microradians, which is greatly below the accuracy sought for the initialization of the North, which is itself of the order of a milliradian.

Images separated in time by 10 seconds may thus detect a movement as small as 0.14 microradians/second, which is nearly 1000 times less than the terrestrial rotation (10 degrees per hour under our latitudes, or 50 microradians per second), accuracy sought for the initialization of the North at an accuracy of the order of a milliradian.

According to another approach, an inertial frame of reference is used as a basis of argument. A first image is acquired, then the gyrometer measures the movements that it experiences during a predefined time interval, movements which are thus composed of the rotation of the Earth and of a possible spurious movement of the system with respect to the ground. A new image is then acquired.

Processing is then applied to the first image to form an intermediate image which corresponds to the first image displaced by a value corresponding to the movements measured by the gyrometer. The intermediate image and the new image are then analyzed to determine their offset which thus corresponds to the rotation of the Earth alone.

In this process, the intermediate image is offset with respect to the first image by a value corresponding to the rotational movement of the Earth increased by the spurious movement, whereas the new image is offset with respect to the first by an amplitude which corresponds to the spurious movement alone. As a consequence, the distance separating the intermediate image and the new image corresponds to the rotational movement of the Earth alone.

Thus, in this case, the rotational movement of the Earth freed of any possible spurious movement, is determined from the offset between the intermediate image and the new image. That has the advantage of eliminating spurious movements of high amplitude. The image processing then operates only on the small displacements induced by the terrestrial rotation, which enables it to be made more accurate.

In a general way, the binoculars with the North seeker rigidly attached to them may be hand-held during the initialization of the geographic North. In this case, the binoculars are equipped, with a horizontality sensor, forcing the user to keep them substantially horizontal, i.e. oriented toward the horizon.

In practice, the binoculars moreover contain a sensor determining their inclination with respect to the horizontal. An error in the measurement of this inclination of 1 milliradian being acceptable during the process of initialization of the geographic North, the horizontality sensor used may be a low-cost, sensor of MEMS type, i.e., Micro-Electro-Mechanical System.

As explained above, the employment of a digital image sensor makes it possible to advantageously replace a precision accelerometer for determining spurious movements, namely the movements of the system with respect to the ground during the geographic North initialization process.

But the use of a digital sensor may also be implemented to update in the binoculars an item of information representative of the orientation of these binoculars with respect to the North when the binoculars are displaced by being used after execution of the process of determining the North.

In this case, after identification of the North, the movements of the binoculars on their tripod may analogously be measured by analysing and comparing the images output by the digital sensor with which the binoculars are equipped.

The image processing may be of the same type as that described above, being based on the recognition of a noticeable object in the image and the identification of its position in the series of images, in such a way as to determine, from the displacement of this object in the images, the angle or angles of rotation of the binoculars. It may also be global processing, of the type corresponding to the processing used for image stabilization.

In other words, the user of the binoculars can then make them turn, for example about, a vertical axis to sweep his environment, while receiving through these binoculars valid information concerning his orientation with respect to the North. In practice, this information may be presented to the user in the form of a display of the bearing corresponding to the current orientation of the binoculars, this bearing being correctly adjusted as the binoculars are rotated on their tripod.

If for example the measurement of rotation by image processing is accurate to 3 microradians between two images, the error on a series of N images has a value, in microradians, of 3 times the square root of N. With a video frame rate of 25 images acquired each second, the North orientation information can be updated and conserved in a valid, manner with an accuracy of one milliradian during a time period of over an hour.

Moreover, a reference image may be stored in the memory of the binoculars in conjunction with the corresponding orientation. In this case, when the binoculars are subsequently pointed at the same orientation, the image received by the image sensor may be compared with the reference image, which then makes, it possible to calibrate, the orientation of the binoculars, in order for example to compensate for a drift of the orientation calculated in the binoculars.

As indicated above, the binoculars are not necessarily carried by a tripod: they can be hand-held during the initialization of the North, but also afterwards. In this situation, the value representative of the orientation of the binoculars with respect to the North is then updated on the basis of image analysis.

In this context, it is also possible to equip the binoculars with a tri-axial gyrometer, or even an Inertial Measurement. Unit, at low cost, for example of MEMS type in order for example to take over when the image analysis is inadequate, due for example to the fact that the scene viewed by the digital image sensor presents inadequate contrast, or else when the displacements to which the user subjects the binocular are too large.

In this situation, the MEMS sensor measures directly and autonomously all the rotations of the binoculars, in such a way as to be able to supply information on the variation of orientation of the binocular in situations where the latter cannot be produced by image analysis. The MEMS sensor of Inertial Measurement Unit type also measures the sideways movements of the binoculars to take possible parallax effects into account.

In practice, tri-axial gyrometric MEMS sensors are of low cost, with the drawback of a large drift; the angular displacement information they supply can only be considered valid during a time period, of a few seconds, given the accuracy sought in this application.

However, as will be understood, they can usefully compensate for a deficiency of at few seconds in the image analysis.

In a more, general way, such a system may also be implemented for equipping a vehicle: the North is then identified when the vehicle is stopped, then it is kept, i.e. updated, using the images acquired by the image sensor during the displacement of the vehicle. In this context, the image processing can consist in detecting the rotations as indicated above, by comparing successive images, but it can also be carried out using two image sensors oriented on either side of the direction of travel of the vehicle to measure the relative motion of the landscape by comparing successive images.

Advantageously, such a system is combined with a trajectory analysis, on the basis of data output by a GPS and/or an Inertial Measurement Unit with MEMS technology, in such a way as to calibrate the North when the vehicle has a simple trajectory. The North can then reasonably be conserved for a time, period of one hour, without needing any recalibraion, i.e. without any need to execute the process of determination of the North from the gyrometer.

The invention claimed is:

1. A method for initializing, in a system comprising an image sensor oriented toward the horizon and a North seeker of gyroscopic or gyrometric type rigidly attached to the image sensor, a value representative of the orientation of the image sensor with respect to the North, the system comprising calculating means implementing the method which comprises:
   determining an offset of two images output by the digital image sensor at distinct first and second instants so as to constitute an item of information representative of an angular movement; and
   discriminating between the movements of the image sensor with respect to the ground and the movements of the image sensor due to the rotation of the Earth from the item of information representative of an angular movement.

2. The method as claimed in claim 1, in which the determination of the offset of the two images is carried out with image processing of the type used for image stabilization, in which the two images are compared in a global manner to determine the offset of these two images.

3. The method as claimed in claim 1, in which the determination of the offset of the two images is carried out by identifying a same object in these two images, by determining the position of this object in each of these images, and by determining the difference between the positions thus determined.

4. The method as claimed in claim 1, in which the images of which the offset is determined are two images representative of the scene seen by the image sensor at two distinct instants, so that the offset is representative of the movements of the digital image sensor with respect to the ground.

5. The method as claimed in claim 1, in which the two images of which the offset is determined are on the one hand an intermediate image corresponding to an image of the scene seen by the image sensor at a first instant and offset by a value corresponding to the movement measured by the North seeker during the interval separating the first instant from the second instant, and an image corresponding to the scene seen by the image sensor at the second instant, so that this offset is representative of the movement of the earth seen from an inertial reference frame during the time interval separating the first instant from the second instant.

6. The method as claimed in claim 1, in which the initialization process uses a North seeker with an Inertial Measurement Unit.

7. The method as claimed in claim 6, in which the Inertial Measurement Unit is based on MEMS-type components.

\* \* \* \* \*